ly 30, 1974

United States Patent [19]
Irwin

[11] 3,826,577
[45] July 30, 1974

[54] GAS ANALYZING APPARATUS

[75] Inventor: Charles P. Irwin, Cupertino, Calif.

[73] Assignee: Commercial Electronics, Inc., Mountain View, Calif.

[22] Filed: Dec. 7, 1972

[21] Appl. No.: 313,006

[52] U.S. Cl................. 356/201, 250/343, 250/573, 356/244
[51] Int. Cl. .......................................... G01n 21/26
[58] Field of Search .......... 250/218, 343, 373, 432, 250/573; 356/87, 51, 201, 207, 208, 244

[56] References Cited
UNITED STATES PATENTS

| | | | |
|---|---|---|---|
| 3,207,026 | 9/1965 | Churchill et al. | 250/218 X |
| 3,381,571 | 5/1968 | Vallee et al. | 356/87 |
| 3,593,023 | 7/1971 | Dodson et al. | 250/343 X |
| 3,696,247 | 10/1972 | McIntosh et al. | 250/218 X |

Primary Examiner—John K. Corbin
Assistant Examiner—F. L. Evans
Attorney, Agent, or Firm—Townsend and Townsend

[57] ABSTRACT

Gas analyzing apparatus in which one or more components in a gas are detected by measuring the rate at which the gas absorbs radiation such as light. The analyzer is defined by an open ended tube disposed concentrically about the optical path of the radiation and a vacuum chamber disposed over the length of the tube and having ends adjacent the tube ends. The vacuum chamber is outside the optical path to prevent its interference therewith. Gas is introduced into the tube, preferably at the middle thereof, thereafter flowed parallel to the optical path to the open tube ends and is then completely withdrawn from the optical tube ends by the vacuum prevailing in the vacuum chamber so that the gas is unable to contact and contaminate either the radiation source or the radiation detector.

19 Claims, 4 Drawing Figures

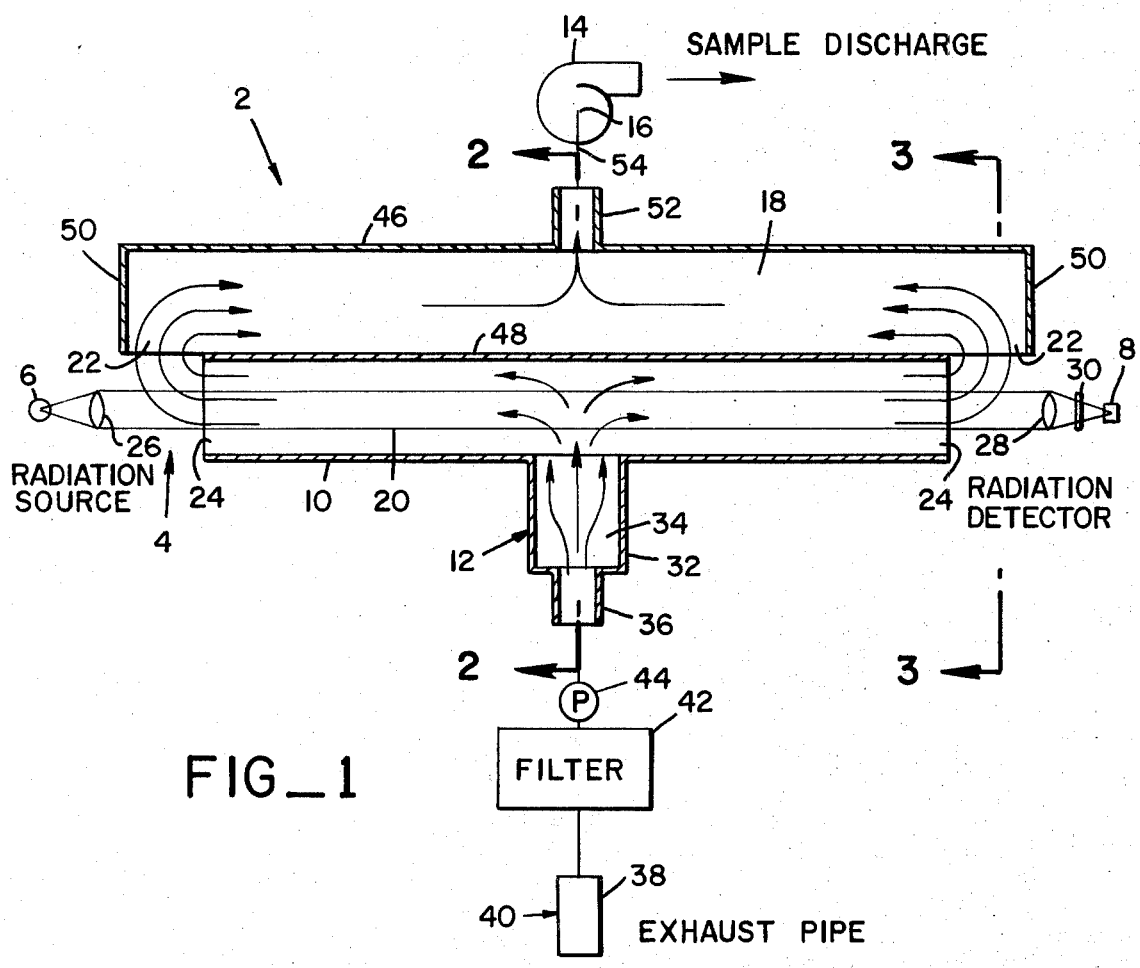
FIG_1
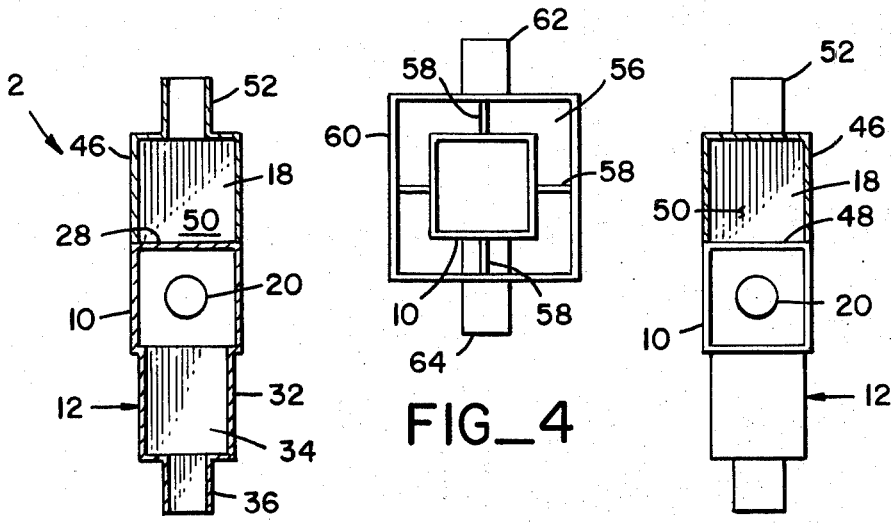
FIG_2   FIG_4   FIG_3

GAS ANALYZING APPARATUS

BACKGROUND OF THE INVENTION

Radiation, e.g. optical gas analysis becomes increasingly popular to monitor the chemical composition of gases, particularly of exhaust gases emitted by internal combustion engines, industry and the like. Changes in the composition of the gas can be detected and remedial action can be taken to optimize combustion processes, control air pollution, or to assure that the gas has a required composition.

Generally speaking, such gas analyzers comprise a radiation source, such as a light source, which directs light beams through the gas sample, or the gas sample flow, onto a radiation detector. Filter means are provided so that only radiation of a given wavelength or lengths can reach the detector.

Each component of the gas sample absorbs radiation of a certain wavelength by an amount which is a function of the ratio of that component in the sample, as well as of the distance the radiation travels through the sample and which inversely affects the amount of radiation of that wavelength sensed by the detector. In this manner the ratio in a sample of a particular component can be determined.

This well known optical gas analysis has practical limitations. First of all, analysis is usually carried forth on exhaust gases which contain a host of particulate matter, condensed or uncondensed water, oil and the like which quickly contaminates all surfaces that come in contact with the gas. Consequently, if the gas contacts either the radiation source or the radiation detector, the resulting contamination on their respective surfaces affects the readings taken by the detector and, thereby, renders the analysis initially inaccurate and after a brief period of time wrong and useless.

The elimination of contamination of the optical system is critical to a proper functioning of the instrument because the concentration of a given component in the gas is relatively low. For example, in the analysis of automobile exhaust gas for CO or HC content the actual absorption of radiation of a gas by these components is in the vicinity of only one percent. Even the slightest contamination of the optical system, say its lenses, can change intensity of the transmitted radiation by one percent. This, however, would render the taken reading useless.

In the past it has been common practice to separate the radiation source and the radiation detector from the contaminating gas flow with windows. Various manners and means for maintaining the windows clean and free of contaminates have been devised. Usually, they require the removal of the windows, or some other access thereto for regular cleaning. Such cleaning is timeconsuming, requires the opening of the instrument, disturbs the components, and frequently requires the re-calibration of the instrument.

Recently, optical gas analyzers have become available which eliminate such viewing windows. In such analyzers the radiation source and detector are separated from the contaminating gas flow by air curtains or flows which pass over openings into a gas sample flow chamber. The copending, commonly owned patent application bearing Ser. No. 227,976, filed Feb. 22, 1972, and entitled GAS ANALYZING APPARATUS, describes and claims an optical gas analyzer having such air curtains.

SUMMARY OF THE INVENTION

The present invention provides gas analyzing apparatus capable of analyzing relatively small sample volumes and flow rates. The gas analysis is carried out in a flow tube through which radiation is passed and in which the sample flows parallel to the direction of the radiation. Before the sample reaches the radiation source or the radiation detector, it is completely withdrawn to avoid contacting them and to thereby prevent their contamination. The flow tube is simple to construct and, therefore, inexpensive. Furthermore, since both the radiation source and the radiation detector never come into contact with the gas sample they are maintenance free so that the instrument can be permanently sealed. This greatly reduces maintenance costs and eliminates the need for frequent re-calibrations of the instrument as is found on many gas analyzers constructed in accordance with the prior art.

In its broader aspects the present invention provides an instrument for analyzing gases such as exhaust gases and the like which has a radiation source aligned with a radiation detector. Chamber defining means such as the flow tube is disposed between the source and the detector for flowing gas substantially parallel to the optical axis between the source and the detector. Means for withdrawing all gas issuing from the chamber is positioned between the gas and the source or the detector and to thereby prevent their contamination by the gas.

The chamber is an elongate, open-ended flow tube and is preferably provided with an expansion chamber communicating with the interior of the tube and disposed substantially midway between the ends thereof. The expansion chamber includes means for introducing a gas sample into the expansion chamber for discharge into the tube and flow longitudinally of the tube towards the ends thereof. The radiation source and the radiation detector are coaxially disposed with respect to the tube and spaced from the respective tube ends.

A vacuum compartment having a generally tubular configuration extends over the length of the tube and terminates in open compartment ends located immediately adjacent the open tube ends. The suction side of pump means such as a fan is connected with the compartment for withdrawing gaseous matter from the compartment and subjecting the compartment to a vacuum. The vacuum at the compartment ends thus withdraws gas issuing from the tube ends.

In one embodiment of the invention the vacuum compartment is a tubular member placed parallel to the flow tube on an exterior side thereof. The vacuum compartment can extend past ends of the flow tube and has open ends which are angularly inclined, e.g., perpendicular to the flow tube ends to facilitate the withdrawal of gas issuing from the tube. In another embodiment the vacuum compartment is a coaxial tubular member enveloping the flow tube. In this embodiment a vacuum is applied over the full periphery of the flow tube ends and the gas sample issuing from the flow tube is evenly withdrawn over that periphery. For purposes of cost reduction in the manufacture of the instrument, it is further preferred that in both embodiments the flow tube and the vacuum chamber have a common wall member that separates them.

For optimal operation of the instrument, it is necessary that the gas flow rate through the flow tube is maintained constant and that a sufficient vacuum is applied to the open ends of the vacuum compartment to withdraw all gas issuing from the flow tube. At the same time, care must be taken that the vacuum is not too high to prevent cavitation of the sample flow into the flow tube, that is to prevent too high of a vacuum from withdrawing too much gas so that air might enter the ends of the flow tube. This would shorten the effective sample length and thus alter the readings taken by the instrument.

Generally, substantially more air than gas is drawn into the vacuum chamber. Satisfactory gas withdrawal rates have been obtained when the flow rate of the fan connected to the vacuum compartment is between about 5 times to about 25 times the gas sample flow rate in the flow tube. Best results have been obtained when the fan flow rate is about 10 times the gas sample flow rate. The flow rate of the gas sample is not critical as long as a continuous gas flow is present in the flow tube. The indicated limits in the fan flow rate might be exceeded by giving the flow tube ends and the vacuum compartment ends particular configurations.

The present invention also provides a method for analyzing the gas. Although the essential steps of the method of the present invention are apparent from the preceeding discussion, they broadly comprise the steps of passing the gas parallel to the optical path between the radiation source and the radiation detector over a distance less than the length of the path and withdrawing all gas from the path before any gas can contact the source or the detector to prevent their contamination. The withdrawing step comprises the step of subjecting the gas flow to a vacuum at points on the path spaced from the source and the detector.

In addition to being adapted for analyzing low gas volumes and being relatively inexpensive to construct, the gas analyzer of the present invention provides a very high degree of accuracy over prolonged periods of operations. There is no need for the frequent cleaning of the components of the optical detection system so that the operative portions of the instrument can be permanently sealed and need not be disturbed. The user of the instrument need not be familiar with calibrating it since he ordinarily does not have to enter it and disturb the initial instrument calibration. Furthermore, the interior of the instrument, and in particular the gas sample flow tube and the ends thereof, can be completely encapsuled since the gas sample is withdrawn via the fan. Air currents, wind, and the like are thus kept from the instrument and cannot disturb the sample flow and thus cannot influence the read-out. Thus, the present invention provides a gas analyzer which is superior in function and less expensive to construct and operate than prior art analyzers.

The required gas sample flow rate can be low even if the optical path length through the sample is relatively long because the flow tube length can be extended without compromising the accuracy of the instrument read-out. The relatively low gas flow rate also permits the use of smaller diameter probes or hoses which guide the gas to the flow tube. Thus, the instrument can be used for analyzing relatively small gas flows such as encountered with low displacement internal combustion engines, for example. Further, during instrument calibration with a calibration gas, the calibration gas consumption is lower. Since the calibration gas is relatively expensive, the present invention affords a substantial cost advantage.

BRIEF DESCRIPTION OF THE DRAWINGS

FIG. 1 is a schematic side elevational view, in section, through a gas analyzer constructed in accordance with the invention;

FIG. 2 is a rear elevation section through the instrument and is taken on line 2—2 of FIG. 1;

FIG. 3 is a rear elevational view, in section, and is taken on line 3—3 of FIG. 1; and FIG. 4 is a rear elevational view similar to FIG. 3 but illustrates another embodiment of the invention in which the vacuum chamber is coaxially disposed about the gas sample flow tube.

DESCRIPTION OF THE PREFERRED EMBODIMENTS

Referring to FIGS. 1–3, the gas sample analyzing instrument 2 constructed in accordance with the invention generally comprises an optical detection system 4 having a radiation source 6 such as a light source and a radiation detector 8 such as a photosensor; an elongate, open-ended gas sample flow tube 10 disposed between the radiation source and the radiation detector; a gas sample inlet port 12; a fan 14 having a suction side or intake 16; and a vacuum chamber or compartment 18 in fluid communication with the suction side of the fan. The flow tube is coaxial with respect to a radiation beam 20 such as light beam. The vacuum chamber has open ends 22 which are positioned immediately adjacent open ends 24 of flow tube 10.

The optical system is conventionally constructed and includes a collimating lens 26 adjacent radiation source 6 and a focusing lens 28 adjacent detector 8. The lenses are spaced some distance from the open ends 24 of the flow tube.

When a gas sample flows through the flow tube and radiation of a known frequency or frequencies is passed through the flow tube known gas components absorb radiation of a particular frequency in an amount which is directly related to the length of the gas flow in the tube as well as to the concentration of such a gas component. The operation of the instrument can be enhanced by inserting a radiation filter 30 in the radition beam to remove all radiation having wavelength components other than wavelengths absorbed by the gas sample component or components under investigation. The filter can be incorporated in the radiation source or can be placed separately therefrom adjacent the source or adjacent the detector as illustrated.

For accurate, reproducible readings radiation beam 20 must travel a minimum distance of the gas sample. For automobile exhaust gas analysis, particularly for CO and CH components in the exhaust gas that minimum distance is usually considered to be approximately 6 inches. Thus, the flow tube 10 preferably has a length of at least about 6 inches. If desired, the length can be increased or decreased to suit particular applications. However, the flow volume of gas is independent from the flow tube length. Thus, accurate gas sample analysis is possible even if the flow volume or the volume of available gas sample per unit time is low since the diameter of the flow tube can be suitably reduced.

Turning now to the actual construction of the instrument of the present invention, in one preferred embodiment of the invention flow tube 10 has a generally square cross section and simply comprises the desired length of an open ended tube. Inlet port 12 is positioned at the longitudinal center of the flow tube and preferably comprises a first section 32 depending from and communicating with the flow tube material which defines an enlarged gas sample expansion chamber 34. A connecting fitting such as a reduced diameter pipe 36 depends from the expansion chamber. The fitting is conventionally hooked up with a source of a gas sample such as an exhaust pipe 38 of an automobile 40. To remove water, particulate matter, oil droplets dispersed in the exhaust gas and the like a conventional filter 42 is interposed between the exhaust pipe and the inlet port 30. A pump 44 is preferably also provided to assure a continuous, constant exhaust gas flow. The construction of both the filter and the pump is conventional and, therefore, not further described herein.

Mounted on top (as viewed in FIGS. 1–3) of flow tube 10 is vacuum chamber 18 defined by a U-shaped channel member 46 which has the same width as the flow tube and a height about equal to or slightly greater than the flow tube. Thus, uppermost wall 48 of flow tube 10 simultaneously defines the interior of the flow tube and, in conjunction with channel member 46, the interior of the vacuum chamber. The channel member 46 may terminate flush with the flow tube or it may be extended beyond the flow tube ends 24 as is shown in FIG. 1. In such an instance, face plates 50 are secured to the ends of the channel member to define downwardly facing vacuum chamber openings 22 which are perpendicular with respect to the flow tube openings 24. This construction of the vacuum chamber ends enhances the withdrawal of gas issuing from the flow tube ends.

Suction side 14 of exhaust fan 16 communicates directly with tube 52 disposed at about the longitudinal center of channel member 46 and communicating with the vacuum chamber. Alternatively, a hose 54 or the like can be used to connect tube 52 to suction side 16 of the exhaust fan.

It will be appreciated that the cross-sectional configuration of both the flow tube and the vacuum chamber can be changed. For example, the flow tube may have a circular cross section and the vacuum chamber may describe an annular segment in cross section, or the flow tube may have a triangular or polygonal cross section.

Referring to FIG. 4, in another embodiment of the invention flow tube 10 may again have a square cross section or, if desired, any other cross section such as a circular one (not shown). A vacuum chamber 56, however, is coaxial with and envelopes the flow tube. Suitable spacers 58 connect and position the flow tube and an outer tubular member 60 that defines the vacuum chamber. The outer tubular member has a cross section complementary to the cross section of the flow tube and a connecting tube 62 for coupling the vacuum chamber with the exhaust fan (not shown in FIG. 4).

In the embodiment of the invention illustrated in FIG. 4 the tubular member is usually flush with the ends of the flow tube and when a vacuum is applied to the chamber, gas issuing from the flow tube ends is drawn over the full periphery of the flow tube into the eveloping chamber. The evenness of the vacuum in the chamber can be enhanced by providing two or more peripherally spaced apart tubes in outer member 60 connection to the suction side of the fan. Furthermore, if desired, the outer tubular member can be extended beyond the ends of the vacuum chamber and provided with face plates so that the vacuum chamber opens angularly inclined, e.g. perpendicular, to the adjacent flow tube opening.

An inlet port 64, preferably constructed as described above, extends through vacuum chamber 56 for connection to a gas sample source.

In the embodiment illustrated in FIG. 4 the role of the two chambers can be reversed. Thus, the vacuum can be applied to the inner tube and the exhaust gas can be introduced into the outer tube. In such an instance the radiation beam must be directed through the outer tube and the vacuum then draws the gas into the inner tube.

Referring to FIGS. 1–4 and turning to the operation of the gas analyzer of the present invention, inlet port 12 (or 64) is connected to an automobile exhaust pipe or the like via filter 42 and pump 44. Fan 14 is activated and subjects chamber 18 (or 56) to a vacuum. Radiation source 6 is energized and detector 8 detects the received radiation intensity and any changes therein. Conventional, well-known electric circuitry is provided to convert the output signals from the detector for powering a suitable indicator, display or the like.

After the exhaust gas is cleansed of particulate matter it enters expansion chamber 34 for full expansion and hence travels into flow tube 10. There the flow divides into two parts, one travelling generally parallel and coaxially with respect to radiation beam 20 towards radiation source 6 and the other travelling in the same manner towards detector 8. The detected radiation intensity is a function of the concentration of certain gas components in the gas sample. In the earlier referred to example wherein the instrument of the present invention is used for monitoring automobile exhaust the filter 30 is selected so that the radiation intensity received from the detector is a direct function of the CO or the HC component in the gas. Alternatively, the filter can be selected for detecting any other gas or gas component such as NO or $NO_2$ for example.

The vacuum in chamber 18 continuously draws gas issuing from the respective flow tube ends 24, as well as ambient air through openings 22 to the chamber interior. From there the gas-air mixture is withdrawn through tube 52, hose 54 to the suction side of fan 14 and hence discharged to the atmosphere. With the earlier given relative flow rate all gas issuing from the flow tube is withdrawn so that there is no contact between the gas sample and the component of the optical system 4. Consequently, the exhaust gas cannot contaminate the optic system which continues to function without need for frequent cleaning.

I claim:

1. Apparatus for analyzing exhaust gas samples and the like for the presence and concentration of a predetermined component comprising:

an elongate, open-ended flow tube including an expansion chamber communicating with the interior of the tube and disposed substantially midway between the ends thereof and means for introducing a gas sample into the expansion chamber for subsequent discharge into the tube and flow longitudinally of the tube towards the open ends thereof, means spaced from one open end for directing radiation coaxially with the tube through the tube and means spaced from the other end of the tube for detecting such radiation and registering a change in the radiation, a vacuum compartment having a generally tubular configuration and extending over the length of the tube, the compartment terminating in open ends disposed immediately adjacent open ends of the tube, pump means including a suction side connected to the compartment for withdrawing gaseous matter from the compartment, and means for introducing gas samples into the expansion chamber at a constant, predetermined rate which is substantially less than the rate at which the pump means withdraws gaseous matter from the compartment, whereby the vacuum formed in the compartment draws gas issuing from the open ends of the tube together with atmospheric air in the vicinity of the open ends into the compartment for discharging to the atmosphere via the pump means.

2. Apparatus according to claim 1 wherein a portion of the tube and of the compartment is defined by a common wall member having a length about equal to the length of the tube.

3. Apparatus according to claim 2 including means extending the compartment beyond the wall member.

4. Apparatus according to claim 3 including means for closing ends of the compartment facing in the direction of the tube ends and wherein the closing means are positioned beyond the projection of the interior of the tube and outside the radiation passing through the tube.

5. A method for continuously analyzing gas by directing radiation from a radiating source along an optical path to a radiation detector and interpreting the detected radiation in terms of its changes, the method comprising the steps of passing the gas parallel to the optical path over a distance less than the length of the path, discharging the gas into an air space extending to the source and to the detector to form an air-gas mixture, and withdrawing from the space a sufficiently large volume of the mixture to include therein all gas discharged into the space to prevent any gas from contacting the source or the detector and to prevent their contamination by the gas.

6. A method according to claim 5 wherein the step of withdrawing comprises the step of subjecting the air space to a sufficient vacuum to withdraw all gas.

7. A method according to claim 5 including the step of controlling the gas flow rate and the rate at which the mixture is withdrawn from the space to prevent changes in the relative length of the gas flow over the optical path.

8. A method according to claim 7 wherein the step of controlling comprises the step of maintaining the gas flow rate constant.

9. A method according to claim 8 wherein the step of controlling further comprises the step of withdrawing the mixture from the space at a rate of at least 5 times greater than the gas flow rate.

10. A method according to claim 9 wherein the step of withdrawing comprises the step of withdrawing at a rate of between about 5 to about 25 times the gas flow rate.

11. A method according to claim 9 wherein the step of withdrawing comprises the step of withdrawing at a rate of between about 10 to about 15 times the gas flow rate.

12. Gas analyzing apparatus comprising an elongate, open-ended housing, means dividing the housing longitudinally into at least a first compartment and an adjacent second compartment, the first compartment having spaced apart openings communicating with the atmosphere, the second compartment having spaced apart, aligned openings communicating with the atmosphere and located adjacent the openings of the first compartment, means for introducing a gas into the second compartment at a point intermediate the openings of the second compartment for flowing gas generally parallel to the axis of the second compartment to the openings thereof, means for subjecting the first compartment to a vacuum of sufficient magnitude to draw all gas issuing from the openings of the second compartment into the respective adjacent openings of the first compartment and thus prevent an escape of gas into the atmosphere surrounding the compartments, means aligned and in direct communication with one of the openings in the second compartment for directing radiation generally parallel to the gas flow through the second compartment, and means aligned and in direct communication with the other opening in the second compartment for sensing the absorption of radiation by the gas in the second compartment.

13. Apparatus according to claim 12 wherein adjacent open ends of the compartments are angularly inclined with respect to each other at an angle less than 180°. 180°

14. Apparatus according to claim 13 wherein the angle is about 90°.

15. Apparatus according to claim 12 including means for introducing the gas into the second compartment at a substantially constant, predetermined flow rate, and wherein the vacuum forming means comprises pump means having a flow rate of between about 5 to about 25 times the gas flow rate.

16. Apparatus according to claim 15 wherein the pump means flow rate is between about 10 to about 15 times the gas flow rate.

17. Apparatus according to claim 12 including means for flowing the gas at a constant, predetermined rate, and wherein the vacuum means includes means for drawing air and gas from the second compartment at a rate which is at least about 5 times the rate at which the gas is introduced into the second compartment.

18. Gas analyzing apparatus comprising a radiation source aligned with a radiation detector, chamber defining means disposed between the source and the detector and aligned therewith, the chamber defining means having open ends spaced apart from the source and the detector, respectively, by open air spaces, the chamber defining means further including a gas inlet disposed between the open ends for flowing gas from the inlet to the open ends of the chamber defining means and to the spaces substantially coaxially with an axis between the source and the detector, and means positioned adjacent the open ends for withdrawing all gas in the spaces and a volume of air substantially greater than the withdrawn volume of gas to prevent the contamination of the source or the detector by the gas.

19. A method for continuously analyzing gas by directing radiation from a radiating source along an optical path through an open-ended tubular member having a first end spaced from the source to a radiation detector spaced from a second end of the member and interpreting the detected radiation in terms of its changes, the method comprising the steps of flowing the gas in the member towards the ends thereof, discharging the gas from the member into the atmosphere surrounding the open ends of the member, subjecting a space between the open ends and the source and the detector, respectively, to a vacuum of a magnitude which causes a flow rate from the spaces greater than the gas flow rate so that atmospheric air and gas is withdrawn from the space and the source and the detector, respectively, are prevented from contact with and contamination by the gas.

* * * * *